US006549692B1

United States Patent
Harel et al.

(10) Patent No.: US 6,549,692 B1
(45) Date of Patent: Apr. 15, 2003

(54) OPTICAL MONITORING OF THE ANGULAR POSITION OF MICRO MIRRORS IN AN OPTICAL SWITCH

(75) Inventors: Roey Harel, Jersey City, NJ (US); Nicolas H. Bonadeo, Aberdeen, NJ (US); Igal Brener, Westfield, NJ (US); James Walker, Freehold, NJ (US)

(73) Assignee: Tellium, Inc., Oceanport, NJ (US)

( * ) Notice: Subject to any disclaimer, the term of this patent is extended or adjusted under 35 U.S.C. 154(b) by 172 days.

(21) Appl. No.: 09/781,306

(22) Filed: Feb. 13, 2001

(51) Int. Cl.[7] ................................................ G02B 6/26
(52) U.S. Cl. ............................ 385/18; 385/15; 385/16; 385/17; 385/14; 385/31; 385/33; 359/291; 359/290; 359/298
(58) Field of Search ............................ 385/18, 15, 16, 385/17, 19, 24, 14, 31, 33; 359/291, 290, 298

(56) References Cited

U.S. PATENT DOCUMENTS 6,337,760 B1 * 1/2002 Huibers et al. ............. 359/223
2002/0071627 A1 * 6/2002 Smith et al. .................. 385/15

* cited by examiner

*Primary Examiner*—Robert H. Kim
*Assistant Examiner*—George Wang
(74) *Attorney, Agent, or Firm*—Jeffery J. Brosemer

(57) ABSTRACT

The position of a micro-mirror, for example, in an optical switch, may be monitored using an optical position control signals that are detected by a detector arrangement. The position of the micro-mirror may be adjusted by detecting the position of the beam spot and comparing the detected position to a desired position.

22 Claims, 11 Drawing Sheets

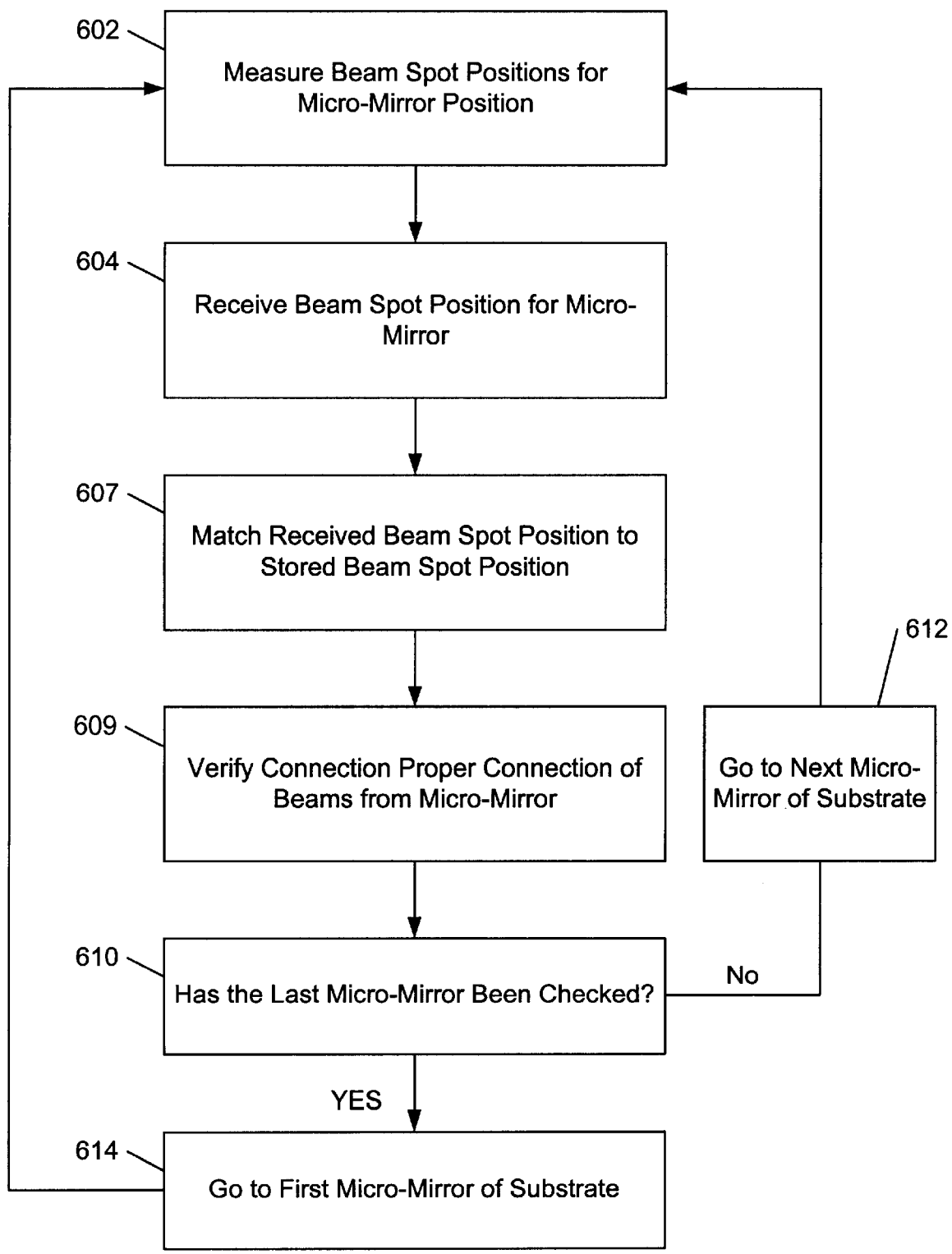

OPTICAL MONITORING OF THE ANGULAR POSITION OF MICRO MIRRORS IN AN OPTICAL SWITCH

BACKGROUND OF THE INVENTION

The present invention relates to a system and method for optically monitoring an optical switch. More particularly, the present invention relates to a system and method for optically monitoring the angular position of micro-mirrors of a MEMS-based optical switch.

Telecommunications providers have increasingly turned to optical transmission methods to meet increasing demand for communications bandwidth. Optical transmission uses light to carry information over optical fiber networks. Light advantageously carries huge volumes of information at blinding speeds.

The telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to reroute communications to bypass fiber breaks or equipment failure thereby restoring communications.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the switch components—including fibers, lenses, and the micromirrors—must be properly aligned and the angular position of the movable micro-mirrors must be precisely controlled. If the angular positions of the movable micro-mirrors are not precisely controlled, some or all of the light from the input fibers will not reach the selected output fiber and the optical transmission will fail. There remains a need in the art for systems and methods for efficiently monitoring the angular positions of the micro-mirrors used in optical switches and systems and methods for connection verification between the micro-mirrors.

SUMMARY OF THE INVENTION

The present invention has been made in view of the above circumstances and has as an object to provide a fast and accurate system and method for monitoring the angular positions of micro-mirrors of an optical switch.

A further object of the invention is to provide an optical switch having accurately controlled micro-mirrors.

A further object of the invention is to provide a method for controlling an optical switch to accurately position its micromirrors.

A further object of the invention is to provide a system and method for connection verification between the micromirrors.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIG. 8 illustrates an exemplary process flow for verifying the connection of the micro-mirrors of an optical switch in accordance with the present invention.

DESCRIPTION OF THE PREFERRED EMBODIMENT

Reference will now be made in detail to the present exemplary embodiment(s) of the invention illustrated in the accompanying drawings. Wherever possible, the same reference numbers will be used throughout the drawings to refer to the same or like parts.

Figure 1:
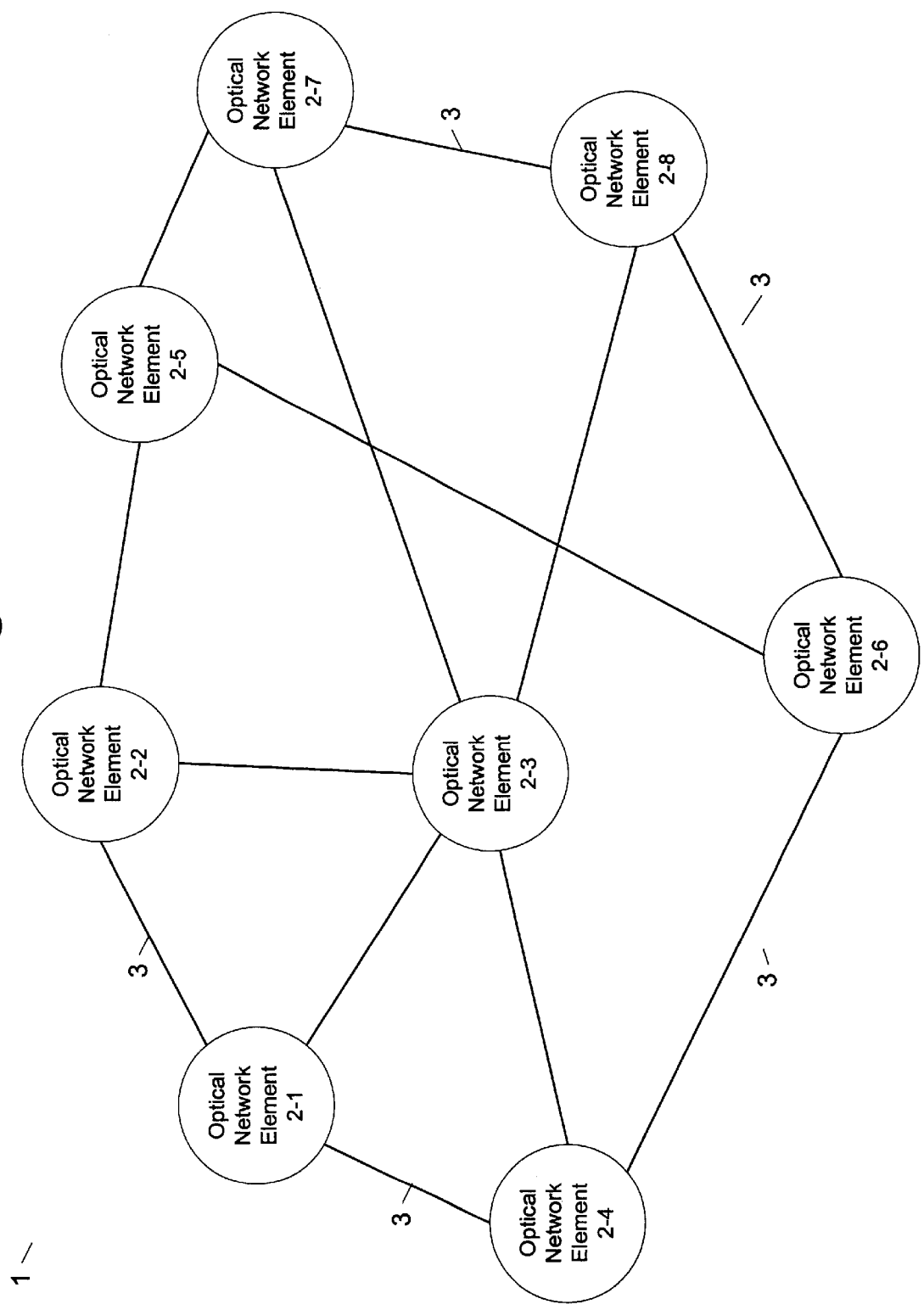
FIG. 1 provides a schematic of an illustrative optical network in accordance with the present invention.

The present invention is useful in optical switches for optical telecommunications network systems that carry optical communications signals, such as wavelength division multiplexed (WDM) signals, over optical fibers. However, in addition or in the alternative, one or more other types of optical signals may be transmitted through the network system. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 includes optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2. The optical links 3 may include, for example, optical fiber.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, for example, information signals may enter the optical mesh network 1 at a local connection to network element 2-1. The information signals may be converted to optical signals, if they are not already, and then travel in the optical network 1 from network element 2-1, through network elements 2-4 and 2-6, and to network element 2-8, where it is passed to a destination in the locality of network element 2-8.

Figure 2A:
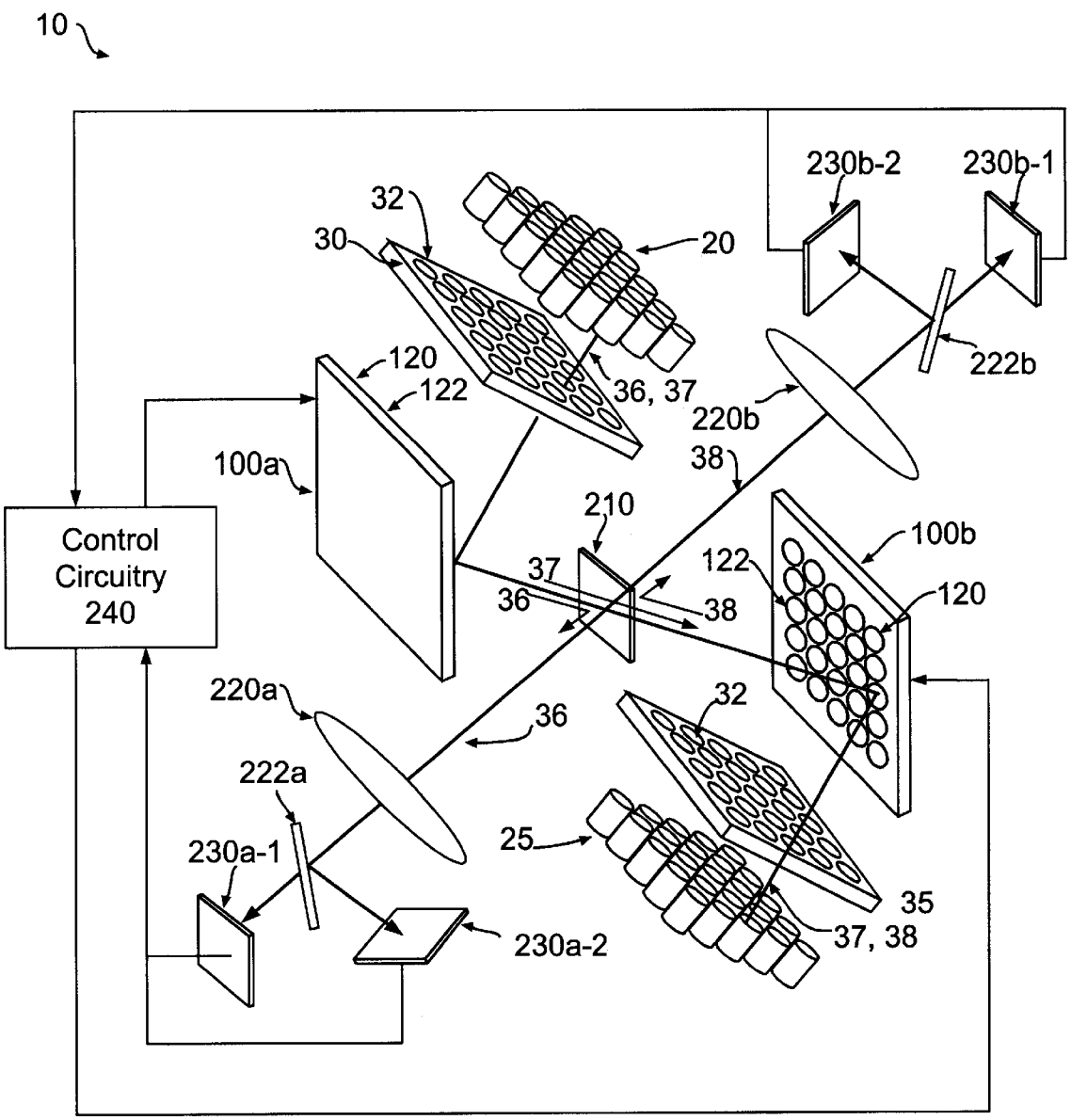
FIG. 2A provides a schematic of a first exemplary optical switch in accordance with the present invention.

FIG. 2A provides a first illustrative embodiment of an optical switch 10 that may be used in an optical network element 2 described in connection with FIG. 1. Of course, the optical switch 10 may be used in other contexts as well. As shown in FIG. 2A, the optical switch 10 includes input optical fibers 20, a first lens array 30, a first switching substrate 100a, a second switching substrate 100b, a second lens array 35, and output optical fibers 25. The optical switch also includes optical monitoring equipment, including a beam splitter 210, first and second lens assemblies 220a and 220b, beam splitters 222a and 222b, detectors 230a-1, 230a-2, 230b-1, and 230b-2, and control circuitry 240. Additional optical components (one or more lenses, for example) may be placed between the two switching substrates 100a and 100b consistent with the present invention.

The input optical fibers 20 may be grouped in a bundle, such that a cross section would produce a two dimensional array. The array of input optical fibers 20 may be formed as a rectangular array (such as a square array). While FIG. 2A shows adjacent rows of the array to have the same number of fibers 20 and that the fibers in adjacent rows are aligned, this arrangement is intended to be exemplary and other patterns may be used consistent with the present invention. Adjacent rows may have a different number of fibers 20 and the fibers 20 in adjacent rows may be offset from each other, for example, by about half the width of the fiber, to increase the packing density of input fibers 20. Output fibers 25 may be arranged in a manner similar to input fibers 20. However, the present invention does not require the input fibers 20 and the output fibers 25 to have the same arrangement.

Lens arrays 30 and 35 include micro-lenses 32 arranged in arrays and aligned with input fibers 20 and output fibers 25, respectively. While FIG. 2A shows lens arrays 30 and 35 as planar arrays, one or both of lens arrays 30 and 35 may be non-planar, such as described in U.S. application Ser. No. 09/758,231, filed Jan. 12, 2001, which is incorporated herein by reference. Light exiting input fibers 20 will be directed through a micro-lens 32 of lens array 30. Similarly, light appropriately directed through micro-lenses 32 of lens array 35 will be inserted into the ends of output fibers 25 and be guided by output fibers 25. In addition, as will be described further below, light emitted from output fibers 25 will be directed through a micro-lens 32 of the lens array 35. While the micro-lenses 32 are shown to be separate from the input and output fibers 20, 25, they may be integrated with the ends of fibers 20 or 25 to form a single unit.

Input fibers 20 may carry optical signals 37 and out-of-band position control signals 36 in a forward direction (i.e., toward the lens array 30). The optical signals include information signals modulated on a carrier signal. The information signals may include data and overhead or control bits. The carrier signal may have wavelength of between 1265–1365 nm and 1530–1565 nm, for example. However, the particular wavelength(s) of the optical signals is provided merely as an example and other wavelength(s) may be used. The wavelength of the out-of-band position control signals may be selected to reduce interference with and/or degradation of the optical signals. The out-of-band position control signals may be, for example, 850–900 nm or 1570–1605 nm.

Output fibers 25 carry the optical signals 37 in the forward direction (i.e., away from lens 35) and out-of-band position control signals 38 in the reverse direction (toward the switching substrate 100b). The out-of-band position control signal 38 may have the same or a different wavelength as the control signal 36 (from fiber bundle 20).

The out-of-band control position signals may be coupled into the input fibers 20 and output fibers 25 using a WDM coupler, a circulator, or other suitable device or technique. The out-of-band position control signals may be generated by a laser or light-emitting diode (LED), for example. The position control signals 36 and 38 may be multiplexed in the respective input fibers 20 and output fibers 25. For example, a time division multiplexing method may be used whereby the out-of-band position control signals 36 (38) are supplied to each input fiber 20 (output fiber 25) in turn. The time division multiplexing may be accomplished, for example, by switching the output of a laser or LED into each fiber 20, 25 in turn. Alternatively, a laser or LED may be provided for each of the fibers 20, 25 and the multiplexing may be achieved by sequentially emitting radiation from the laser or LED into the fibers.

Switching substrates 100a and 100b each include a plurality of switching elements 120. As shown in FIG. 2A, the switching elements 120 are arranged in an array on the switching substrates 100b. The switching elements 120 are similarly arranged on substrate 100a. While FIG. 2A shows the switching elements 120 arranged in a rectangular array in which each row and column have the same number of switching elements 120 and the switching elements 120 are aligned between rows and columns, this is merely an example. The switching elements 120 may be arranged in other patterns, such as a rectangle, an ellipse or a truncated ellipse, for example.

Moreover, the switching elements 120 in adjacent rows and/or columns may be offset from each other, for example, by a half of the center-to-center spacing between switching elements in an adjacent row or column. Such an offset spacing arrangement increases the packing density of switching elements.

Further, while switching substrates 100a and 100b are shown as planar substrates, non-planar substrates may also be used, such as described, for example, in U.S. application Ser. No. 09/757,475, filed Jan. 11, 2001, which is incorporated herein by reference, and U.S. application Ser. No. 09/754,260, filed Jan. 5, 2001, which is incorporated herein by reference.

The switching elements 120 include micro-mirrors 122. According to one embodiment, the micro-mirrors 122 may be tilted about each of two orthogonal axes so that each micro-mirror 122 of the first substrate 100a can direct an optical signal beam from a micro-lens 32 of lens array 30 to any micro-mirror 122 of the second substrate 100b and each micro-mirror 122 of the second substrate 100b can direct the optical signal beam through a micro-lens 32 of lens array 35 into an output fiber 25. The micro-mirrors 122 may be gimbaled to permit pivoting about at least two axes that may be perpendicular to each other. The micro-mirrors 122 may be tilted by, for example, electrostatic force between the mirrors 122 and drive electrodes formed in the substrates 100. Of course, any suitable expedient may be used to tilt the mirrors. In a preferred embodiment, switching substrates 100a and 100b are microelectromechanical system (MEMS) devices.

As suggested above, the optical switch 10 may be used to selectively couple optical signals 37 from input fibers 20 to selected output fibers 25. As shown in FIG. 2A with a single optical signal beam 37, the first lens array 30 receives the input optical signal from the input optical fibers 20 at a micro-lens 32 and directs the input signal beam 37 to a switching element 120 of the first switching substrate 100a. Depending on the angular position of the micro-mirror 122, the input optical beam is reflected to a selected micro-mirror 122 of the second substrate 100b. The micro-mirror 122 of the second substrate 100b reflects the input optical beam through a lens 32 of the second lens array 35 to a selected one of the output optical fibers 25. Thus, the optical beam passes out of the input optical fiber 20, passes through a lens 32 of the first lens array 30, is reflected by switching elements of the first and second switching substrates 100a, 100b, passes through a lens 32 of the second lens array 35, and is directed into a selected output optical fiber 25.

Beam splitter 210 is located in the optical path at some position between the first and second switching substrates 100a, 100b. For example, the beam splitter 210 may be centered between the switching substrates 100a, 100b or may be closer to one switching substrate or the other. Beam splitter 210 is designed to pass the optical signal beams 37 reflected from the first switching substrate 100a so that they are incident on the second switching substrate 100b, but reflect or otherwise redirect the out-of-band position control signals 36 reflected from the first switching substrate 100a before they reach the second switching substrate 100b, and reflect or otherwise redirect the out-of-band position control signals 38 reflected from the second switching substrate 100b before they reach the first switching substrate 100a. Out-of-band position control signals 36 are reflected to lens assembly 220a and control signals 38 are reflected to lens assembly 220b. For example, beam splitter 210 may be provided with two reflective surfaces on opposite sides thereof, where the reflective surfaces pass optical signals 37 but reflect out-of-band position control signals, 36, 38. Alternatively, beam splitter 210 may be designed to pass the out-of-band control signals to the lens assemblies and reflect the optical signal beams to the second switching substrate 100b. While FIG. 2A illustrates a beam splitter 210, it should be clear that the beam splitter 210 may be replaced by other suitable equipment that can direct a beam from micro-mirrors 122 away from the optical signal beam path. For example, a portion of the optical signal beam (either with or without an out-of-band control signal) may be directed to an appropriate lens assembly.

Each reflected out-of-band position control signal 36, 38 is focused by lens assembly 220a, 220b, respectively, into a beam spot. Lens assemblies 220a and 220b may include, for example, one or more aspheric lenses.

As shown in FIG. 2A, beam splitter 222a is positioned between lens assembly 220a and detectors 230a-1 and 230a-2. However, beam splitter 222a may be integrated into the lens assembly 220a or may be positioned in the optical path before the lens assembly 220a, in which case the lens assembly 220a may be provided with additional optics to focus both rays of the split beam. Beam splitter 222a splits the out-of-band position control signal beam 36 to produce a beam spot on the detection surface of each of the detectors 230a-1 and detector 230a-2. Detectors 230a-1 and 230a-2 detect the position of the beam spots from lens assembly 220a and beam splitter 222a and provide angular position information of the micro-mirrors of switching substrate 100a to the control circuitry 240. For example, if the angular position of a micro-mirror 122 of switching substrate 100a is changed, the micro-mirror will reflect the position control signal 36 through lens assembly 220a and via beam splitter 222a to a different point on the surface of at least one of detectors 230a1 and 230a2. Control circuitry 240 determines (as will be described further below) whether or not the measured position of the beam spots equals the desired position of the beam spots and thus provides information regarding the angular position of the micro-mirror 122 of substrate 100a that reflected the beam.

Similarly, a beam splitter 222b is positioned between lens assembly 220b and detectors 230b-1 and 230b-2. Beam splitter 222b splits the out-of-band position control signal beam 38 to produce a beam spot on the detection surface of each of the detectors 230b-1 and detector 230b-2. Similar to detectors 230a-1 and 230a-2, detectors 230b-1 and 230b-2 detect the position of the beam spots from lens assembly 220b and beam splitter 222b and provide angular position information of micro-mirrors 122 of switching substrate 100b to the control circuitry 240. As noted above, the beam splitter 222b may be integrated into the lens assembly 220b or may be positioned in the optical path before the lens assembly 220b, in which case the lens assembly 220b may be provided with additional optics to focus both rays of the split beam.

Detectors 230a-1, 230a-2, 230b-1, and 230b-2 are preferably capable of detecting the light of the beam at a rate sufficient to enable real-time control of the micro-mirrors angular position. As noted above, the out-of-band control signals 36, 38 may be time multiplexed in each fiber 20, 25 so that the angular position of each mirror 122 of substrates 100a, 100b can be detected sequentially. Depending on the type of detector used, the detection speed may vary according to the size of the detector. A detector with relatively small dimensions may be used to increase the detection speed. Accordingly, the size of the detector may be selected to yield sufficiently high detection speed for the application. In addition, the resolution of the detector may depend on the time used to detect the spot beam. The beam spot must have some finite size and its position on the detectors 230 should vary over some spatial distance to reflect the tilt range of the micro-mirrors and their spatial separation on the switching substrate. In order to achieve real-time control, the detector should be capable of reading the beam position of each micro-mirror 122. For example, if the position of each mirror is detected in 50 microsecond intervals and the substrate includes 100 mirrors, the detection rate must be 2 MHz or higher. Under the same circumstances, if the substrate has 1000 mirrors, a detection rate should be 20 MHz or higher.

Using the measured position of the beam spots, control circuitry 240 determines whether or not the micro-mirror is in its desired angular position. As described further below, the control circuitry 240 may include a set of look-up tables that store the desired beam spot position on the detectors 230. Control circuitry 240, responsive to the position information from the detectors 230a-1, 230a-2 and 230b-1, 230b-2, may generate mirror position control signals to adjust the angular position of the micro-mirrors 122 of substrates 100a and 100b. In this way, the optical switch 10 can ensure accurate coupling of optical beams from the input optical fibers 20 to the output optical fibers 25.

Control circuitry 240 may include digital control circuitry, such as a computer, microprocessor, microcomputer, digital signal processor, an application specific integrated circuit, or other controller. While shown in FIG. 2A as a single functional block, control circuitry 240 may be distributed between a central controller and sub-controllers or between a plurality of sub-controllers. For example, one controller or sub-controller may be used for controlling the micro-mirrors 122 of substrate 100a and another controller or sub-controller may be used for controlling the micro-mirrors 122 of substrate 100b. Control circuitry 240 may be provided in whole or in part on the substrates 100a and 100b.

In the optical switch 10 illustrated in FIG. 2A, the optical signal beam 37 traverses a generally "Z" shaped path between the input fibers 20 and the output fibers 25. It should be understood that the present invention may be used in connection with other switching arrangements, e.g., arrangements in which the optical signal beam traverses a generally V-shaped path, a generally W-shaped path, or in combination with other mirror structures such as combinations of one-dimensional actuated micro-mirrors, or other arrangement.

Figure 2B:
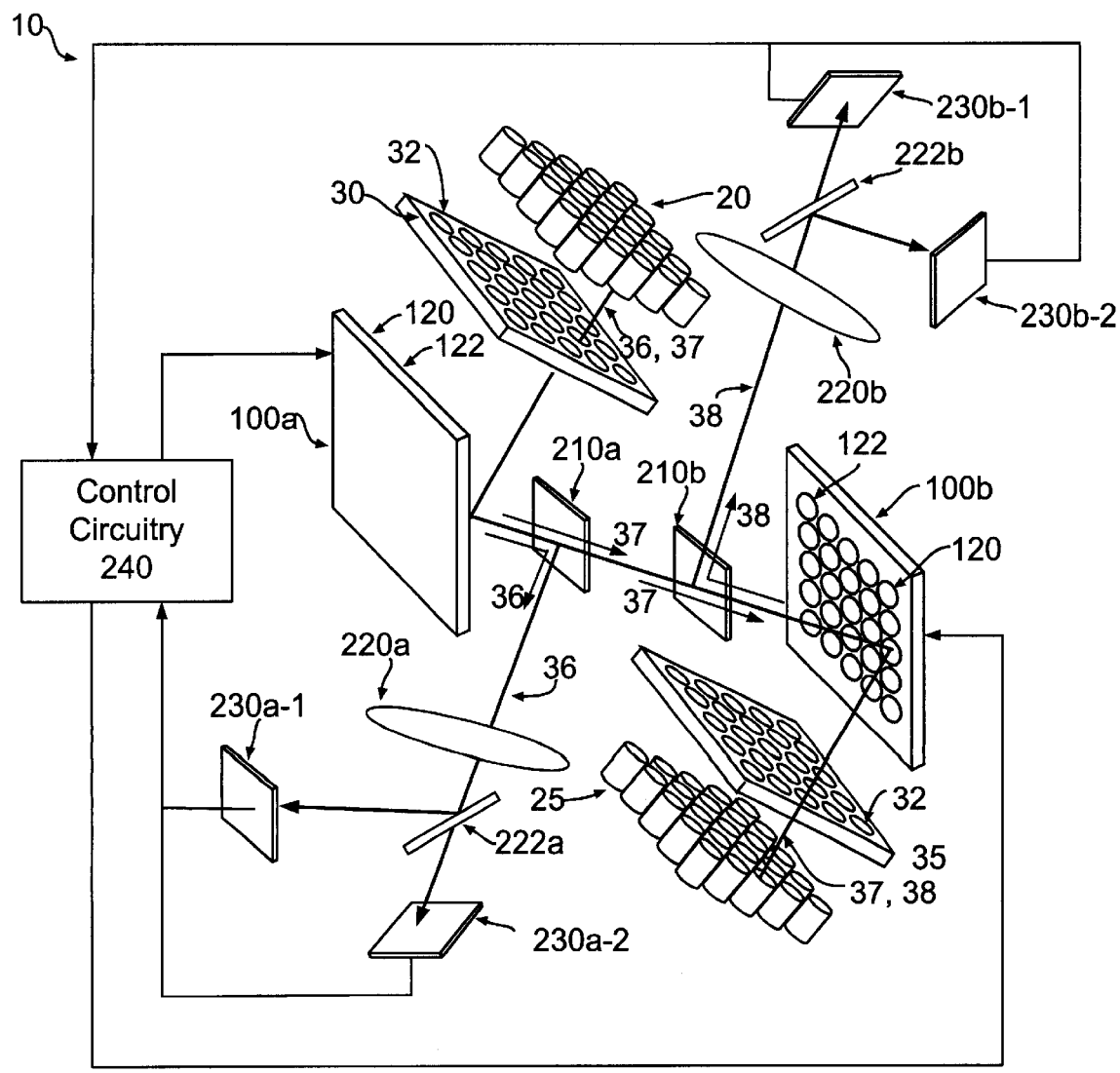
FIG. 2B provides a schematic of a second exemplary optical switch in accordance with the present invention.

FIG. 2B illustrates a second exemplary embodiment of an optical switch 10 that may be used in an optical network element 2 described in connection with FIG. 1. Of course, the optical switch 10 may be used in other contexts as well. FIG. 2B includes features similar to those described above in connection with FIG. 2A, which will not be repeated for the sake of brevity. As shown in FIG. 2B, two beam splitters 210a and 210b. Beam splitter 210a is position proximate to first switching substrate 100a and beam splitter 210b is positioned proximate to switching substrate 100b. Consistent with the present invention, additional optical components (one or more lenses, for example) may be placed between the two switching substrates 100a and 100b, e.g., between the two beam splitters 210a, 210b.

Optical switch 10 of FIG. 2B may be used to selectively couple optical signals 37 from input fibers 20 to selected output fibers 25. As shown with a single optical signal 37 in FIG. 2B, the first lens array 30 receives the input optical signal from the input optical fibers 20 at a micro-lens 32 and directs the input signal beam 37 to a micro-mirror 122 of the first switching substrate 100a. Depending on the angular position of the micro-mirror 122, the input optical beam is reflected to a selected micro-mirror 122 of the second substrate 100b. The input optical beam 37 passes through beam splitters 210a and 210b. The micro-mirror 122 of the second substrate 100b reflects the input optical beam through a lens 32 of the second lens array 35 to a selected one of the output optical fibers 25. Thus, the optical beam passes out of the input optical fiber 20, passes through a lens 32 of the first lens array 30, is reflected by a micro-mirror 122 of the first switching substrate 100a, passes through beam splitters 210a, 210b and any other optical devices that may be provided therebetween, is reflected by a micro-mirror 122 of the second switching substrate 100b, passes through a lens 32 of the second lens array 35, and is directed into a selected output optical fiber 25.

Beam splitters 210a and 210b may be located at any position in the optical path between the first and second switching substrates 100a, 100b. For example, the beam splitters 210a and 210b may be positioned symmetrically of the midpoint between the substrates. As noted above, beam splitter 210a is designed to pass the optical signal beams 37 reflected from the first switching substrate 100a so that they may be incident on the second switching substrate 100b, but reflect or otherwise redirect the out-of-band position control signals 36 reflected from the first switching substrate 100a before they reach the second switching substrate 100b. Beam splitter 210b is designed to pass the optical signal beams 37 reflected from the first switching substrate 100a so that they may be incident on the second switching substrate 100b, but reflect or otherwise redirect the out-of-band position control signals 38 reflected from the second switching substrate 100b before they reach the first switching substrate 100a.

Out-of-band position control signals 36 are reflected to lens assembly 220a and control signals 38 are reflected to lens assembly 220b. Detection of the control signals 36, 38 and control of the micro-mirrors 122 may be accomplished as described above in connection with FIG. 2A. While FIG. 2B shows beam splitter 210a reflecting position control beam 36 and beam splitter 210b reflecting position control beam 38, beams splitters 210a and 210b may be provided so that beam splitter 210b reflects position control beam 36 and beam splitter 210a reflects position control beam 38. In addition, it should be clear that the beam splitters 210a, 210b may be replaced by other suitable equipment that can direct a beam from micro-mirrors 122 away from the optical signal beam path.

Figure 2C:
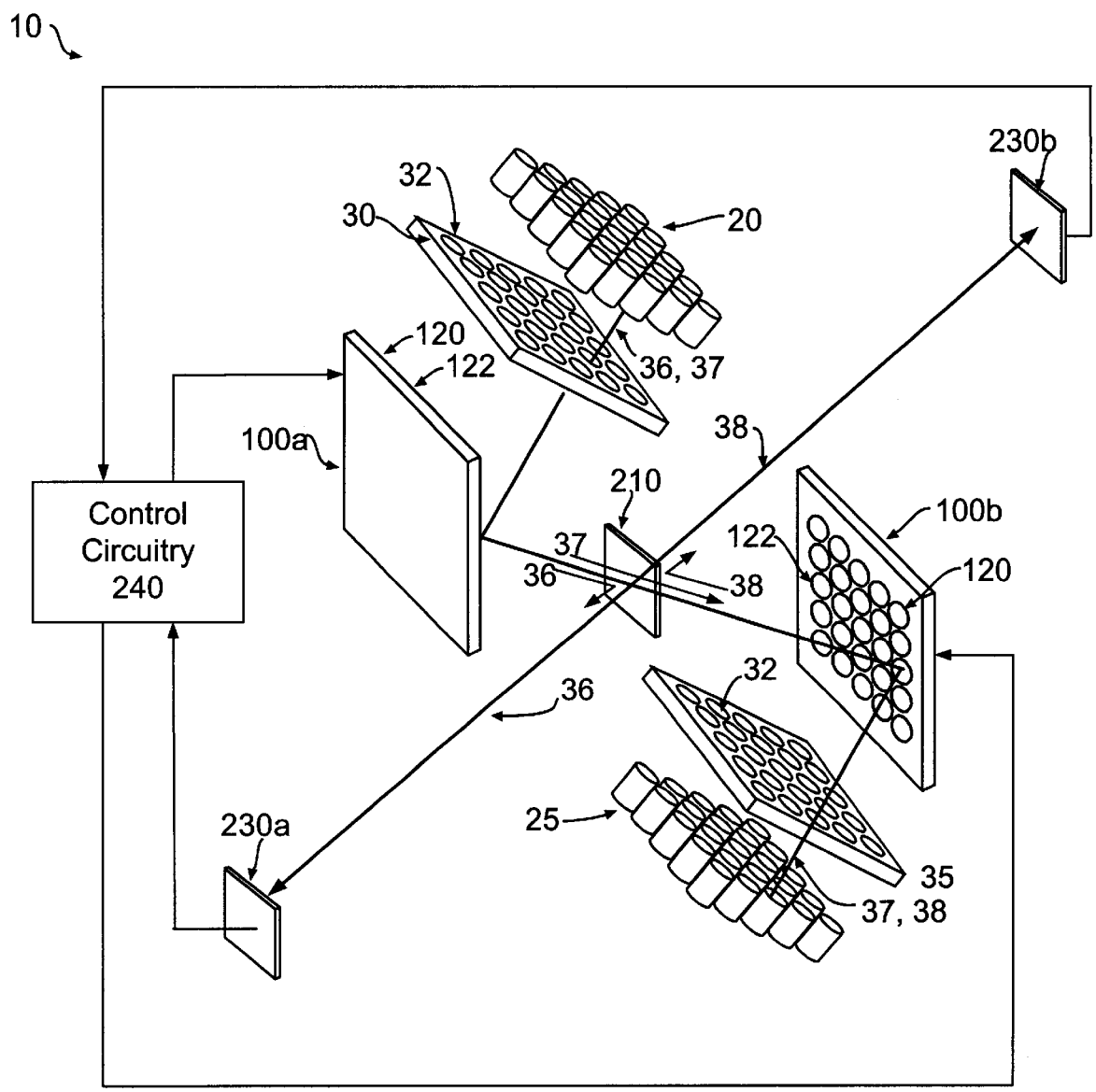
FIG. 2C provides a schematic of a third exemplary optical switch in accordance with the present invention.

FIG. 2C illustrates a third exemplary embodiment of the optical switch 10 according to the present invention that may be used in an optical network element 2 described in connection with FIG. 1. Of course, the optical switch 10 may be used in other contexts as well. FIG. 2C includes features similar to those described above in connection with FIGS. 2A and 2B, which will not be repeated for the sake of brevity. As shown in FIG. 2C, a beam splitter 210 directs out-of-band position control signal beam 36 to detector 230a and out-of-band position control signal beam 38 to detector 230b. In the example of FIG. 2C, a single detector 230a is used to detect the position of the beam spot produced by beam 36 and a single detector 230b is used to detect the position of the beam spot produced by beam 38. The lens assemblies 220a, 220b and beam splitters 222a, 222b are not included. The optical switch 10 otherwise functions similar to that described above in connection with FIG. 2A. Of course, the single beam splitter 210 of FIG. 2C may be replaced by two beam splitters 210a and 210b, as described above in connection with FIG. 2B. Moreover, additional optical components (one or more lenses, for example) may be placed between the two switching substrates 100a and 100b, e.g., between the two beam splitters 210a, 210b.

Figure 2D:
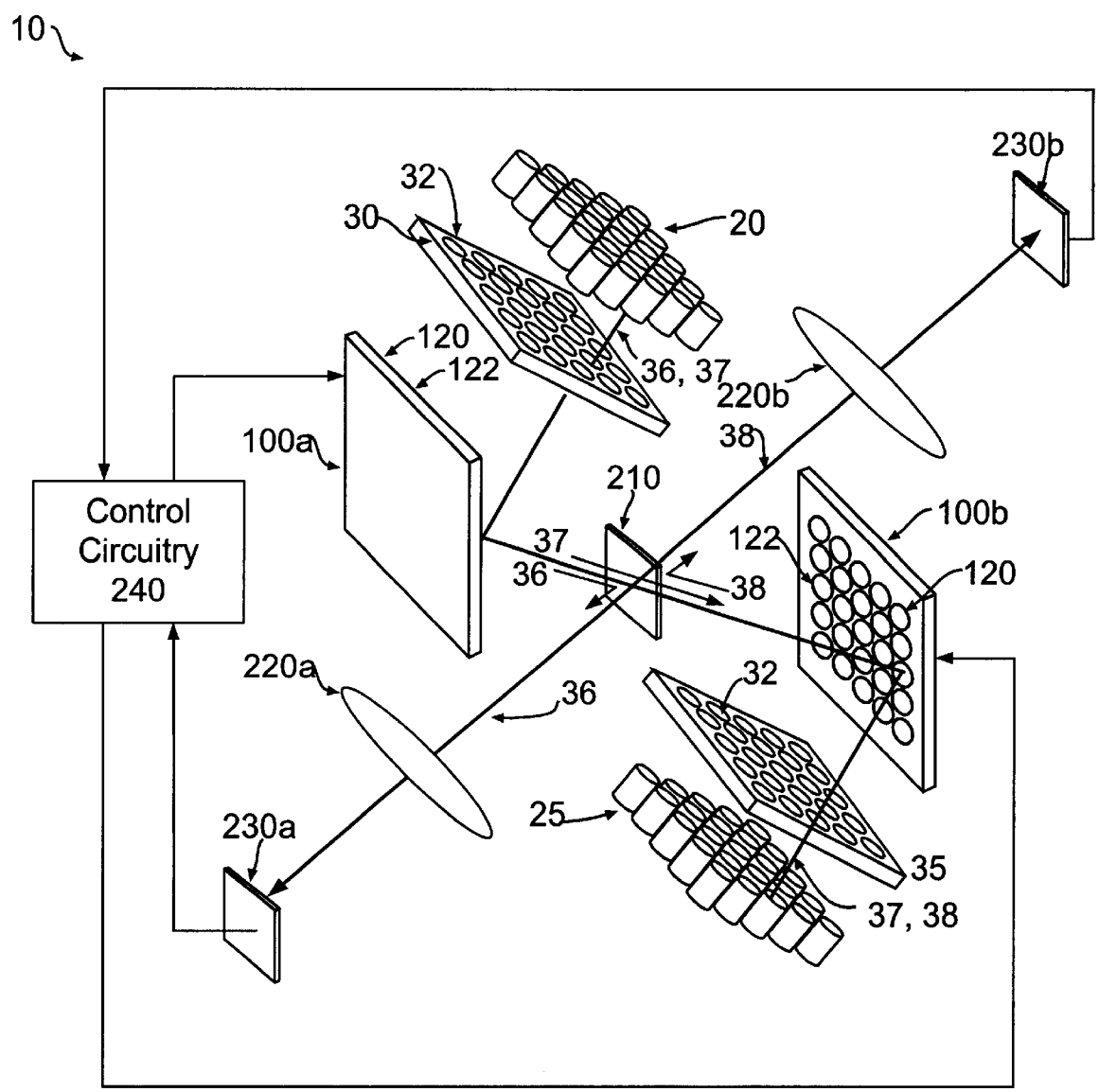
FIG. 2D provides a schematic of a fourth exemplary optical switch in accordance with the present invention.

FIG. 2D illustrates a fourth exemplary embodiment of the optical switch 10 according to the present invention that may be used in an optical network element 2 described in connection with FIG. 1. Of course, the optical switch 10 may be used in other contexts as well. FIG. 2D includes features similar to those described above in connection with FIGS. 2A, 2B and 2C, which will not be repeated for the sake of brevity. As shown in FIG. 2D, a beam splitter 210 directs out-of-band position control signal beam 36 through lens assembly 220a. Lens assembly 220a produces a beam spot on the sensing surface of detector 230a. Beams splitter 210 also directs out-of-band position control signal beam 38 through lens assembly 220*b*, which focus the beam to produce a beam spot on detector 230*b*. In the example of FIG. 2D, the beam splitters 222*a*, 222*b* are not included. The optical switch 10 otherwise functions similar to that described above in connection with FIG. 2A–2C. The single beam splitter 210 of FIG. 2D may be replaced by two beam splitters 210*a* and 210*b*, as described above in connection with FIG. 2B. Moreover, additional optical components (one or more lenses, for example) may be placed between the two switching substrates 100*a* and 100*b*, e.g., between the two beam splitters 210*a*, 210*b*.

Figure 3:
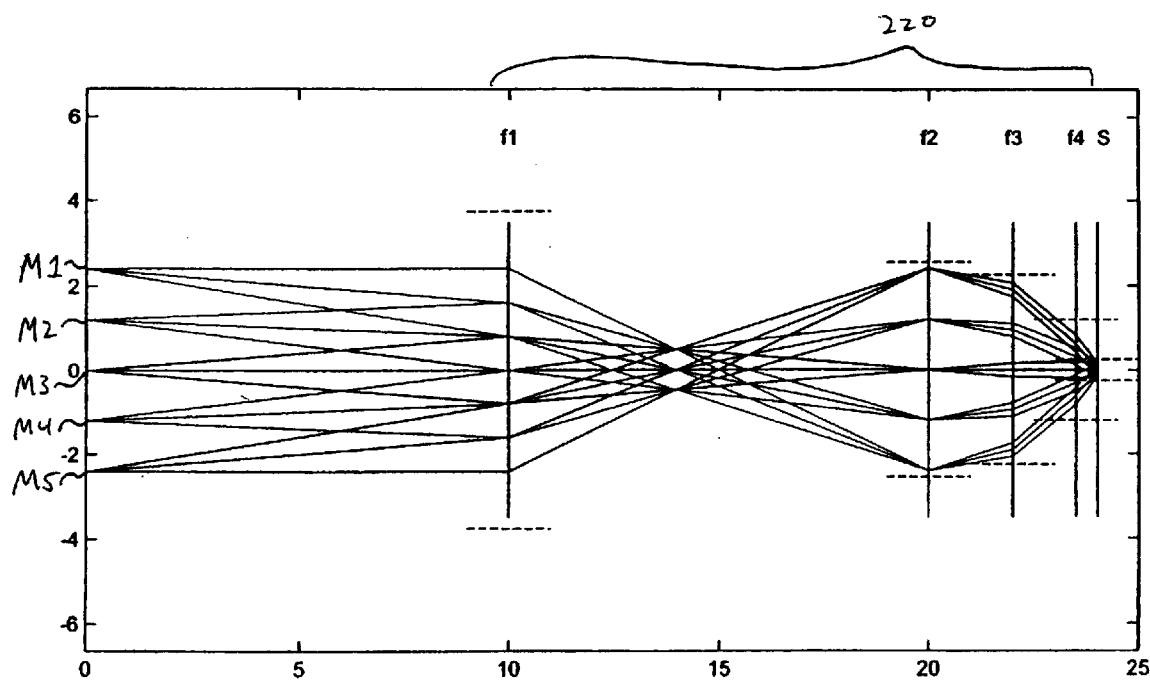
FIG. 3 provides a plot showing an example of the operation of a lens assembly in accordance with the present invention.

FIG. 3 provides an exemplary plot of the operation of a lens assembly 220 for purposes of explanation. The lens assembly 220 represented in FIG. 3 includes four lenses f1, f2, f3, and f4. At the left side of the plot, the Y-axis shows the spatial separation and full tilt range of mirrors M1, M2, M3, M4, and M5 in a single plane. The mirrors M1–M5 may correspond to a row or column of micro-mirrors 122 of a switching substrate 100. The tilt range illustrated may correspond to the tilt needed to reflect an optical signal beam to each micro-mirror of the other substrate 100. Beams originating from the mirrors are focused by lenses f1, f2, f3, and f4 onto a surface S, which represents the surface of the detector. As shown in FIG. 3, the possible range of optical beams from the mirrors M1–M5 may be focused into relatively small region at surface S. In respect to FIG. 3, a beam splitter 222 may be placed, for example, between lenses f1 and f2.

Figure 4:
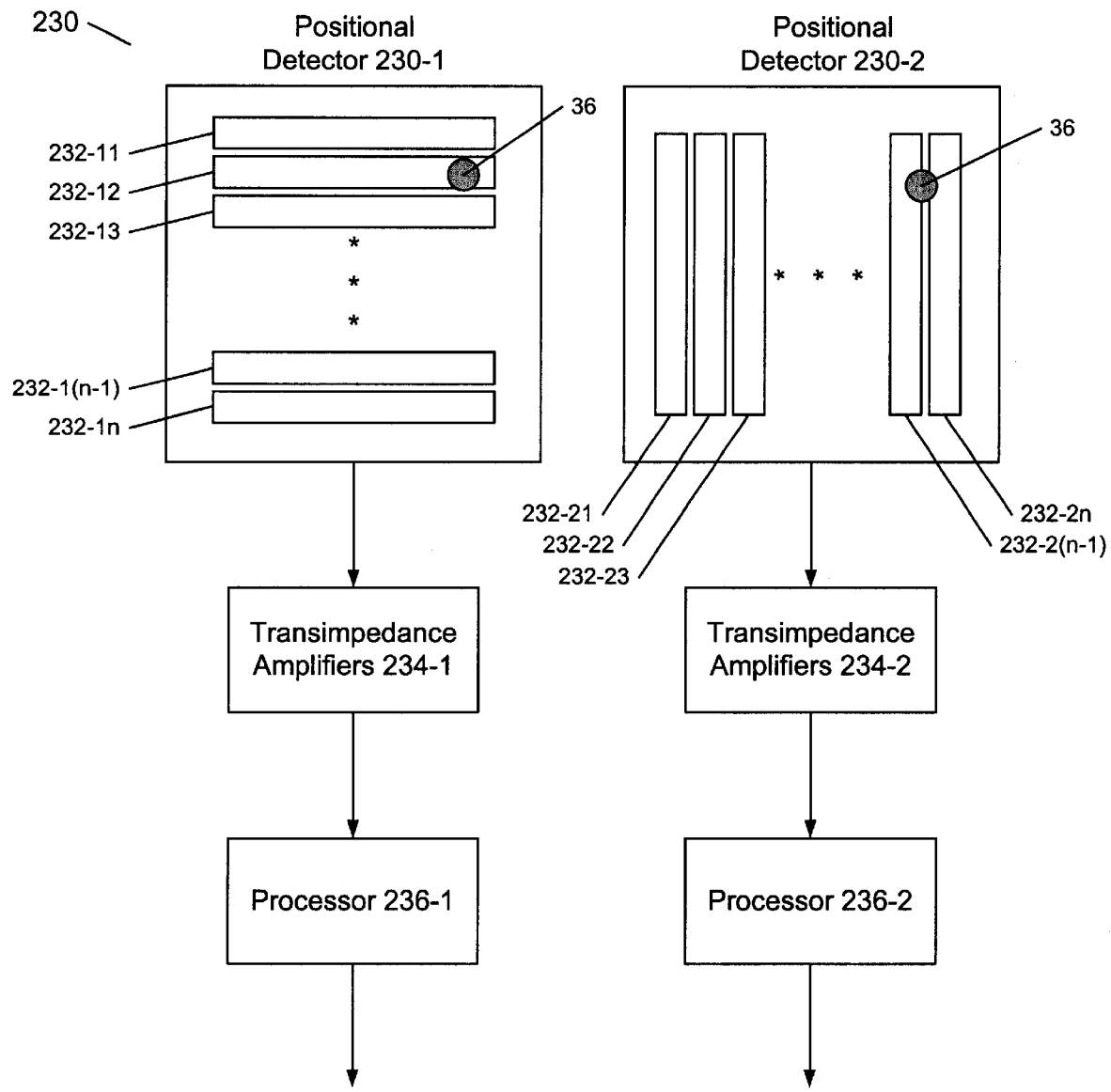
FIG. 4 illustrates a first exemplary embodiment of a positional detector in accordance with the present invention.

FIG. 4 illustrates an exemplary embodiment of a detector pair 230. The detector pair 230 illustrated in FIG. 4 may be used as either the detectors 230*a*-1 and 230*a*-2 or detectors 230*b*-1 and 230*b*-2 of FIGS. 2A and 2B. Of course, other suitable detector arrangements may be used with the optical switch of FIGS. 2A and 2B as well. As shown, the detector 230 may include a first linear position sensor device 230-1 and a second linear position sensor device 230-2. In this case, the beam splitter 222 or other optical equipment may be provided to split the beam from the lens assembly and direct the split beams onto the first and second linear position sensor devices 230-1, 230-2. The linear position sensor device 230-1, 230-2 may be oriented orthogonal to each other so that one senses the position of the spot beam along a first axis (e.g., the X-axis) and the other senses the position of the spot beam along a second orthogonal axis (e.g., the Y-axis). However, such an orthogonal arrangement is not required.

More particularly, the first linear sensor device 230-1 may include a plurality of sensor lines 232-11 to 232-1n. Each of the sensor lines 232-11 to 232-1n is capable of sensing the linear position of an incident beam spot in a horizontal direction and, in some embodiments, with sufficient resolution and speed to permit real-time control of the mirrors 122. A beam spot 36 is shown on sensor line 232-12 for purposes of illustration. Each of sensor lines 232-11 to 232-1n generates a current indicative of the position of a beam spot, if any, incident upon it. The currents are supplied to amplifiers 234-1, for example, transimpedance amplifiers that convert the sensed currents to voltage signals. The signals from amplifiers 234-1 are supplied to processor 236-1. The processor 236-1 may include an analog-to-digital converter and a digital signal processor and may have logic capability. Processor 236-1 may determine which sensor line(s) 232-11 to 232-1n detected the spot beam and generate a horizontal position signal of the spot beam. The horizontal position signal may be provided to the control circuitry 240.

Similar to the first linear sensor device 230-1, the second linear position sensor 230-2 may include a plurality of sensor lines 232-21 to 232-2n. Of course, the number of sensor lines of the first position sensor need not be the same as the number of sensor lines of the second position sensor. Each of the sensor lines 232-21 to 232-2n is capable of sensing the linear position of an incident beam spot in a vertical direction and, in some embodiments, with sufficient resolution and speed to permit real-time control of the mirrors 122. A beam spot 36 is shown spanning sensor lines 232-2(n−1) and 232-2n for purposes of illustration. Each sensor line 232-21 to 232-2n generates a current indicative of the position of a beam spot, if any, incident upon it. The currents are supplied to amplifiers 234-2, for example, transimpedance amplifiers that convert the sensed currents to voltage signals. The signals from amplifiers 234-2 are supplied to processor 236-2. The processor 236-2 may include an analog-to-digital converter and a digital signal processor and may have logic capability. Processor 236-2 may determine which sensor line(s) 232-21 to 232-2n detected the spot beam and generate a vertical position signal of the spot beam. The vertical position signal may be supplied to the control circuitry 240.

Figure 5A:
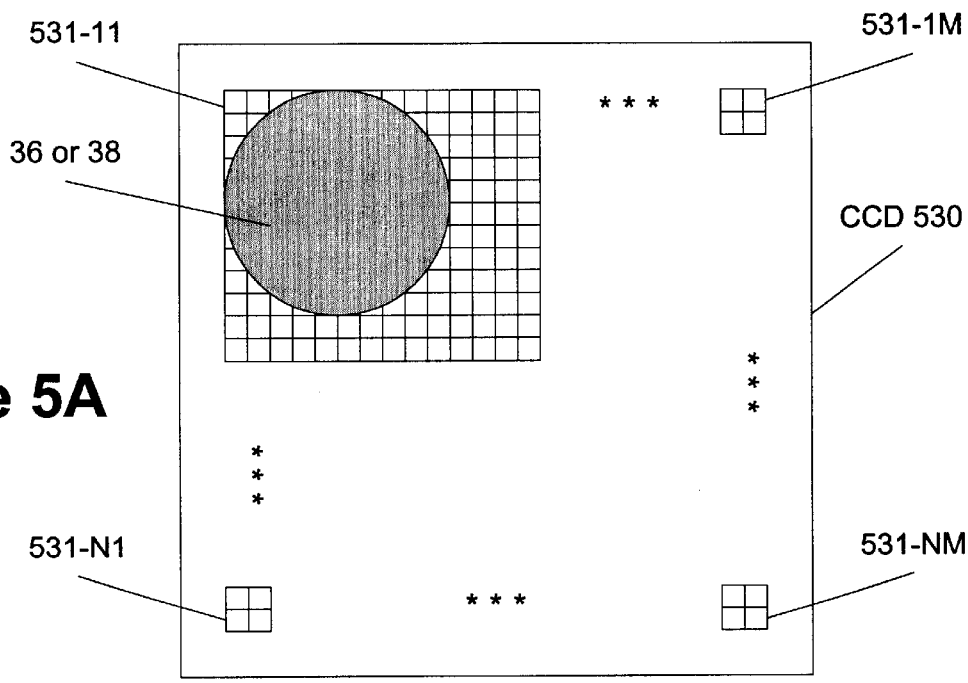
FIG. 5A illustrates an exemplary embodiment of a positional detector in accordance with the present invention.
Figure 5B:
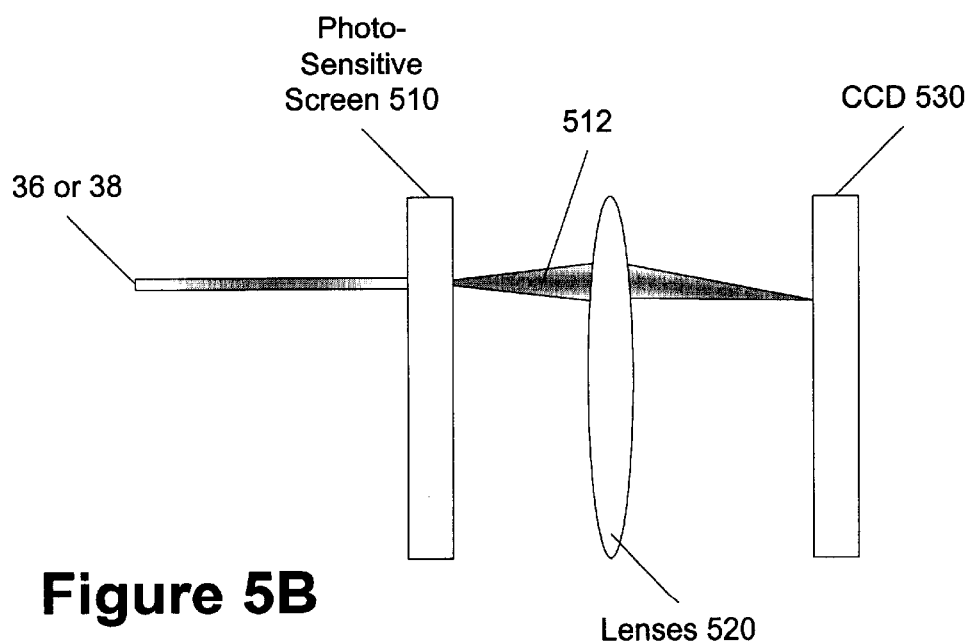
FIG. 5B illustrates an exemplary embodiment of a positional detector in accordance with the present invention.

FIGS. 5A and 5B illustrate an exemplary embodiment of a detector 230 that may be used in connection with the embodiment of FIG. 2C. The embodiment of FIGS. 5A and 5B is intended as an example and other detectors 230 may be used in connection with the optical switch of FIG. 2C. As shown in FIG. 5A, detector 230 may be a CCD array 530. The CCD array 530 includes a plurality of CCD imaging elements 531-11 to 531-NM formed in an N×M array. For example, the CCD array 530 may be a 256×256 array, with each imaging element being 10 μm×10 μm. These dimensions are exemplary and the detector 230 may number of elements and/or a different size of imaging elements. As shown in FIG. 5A, the CCD array 530 is larger than the beams post 36 or 38 so that the CCD array 530 can detect the position of the beam spot in two dimensions.

FIG. 5B illustrates an arrangement in which the beam 36 or 38 illuminates a photo-sensitive screen 510. The photo-sensitive screen 510, responsive to the beam 36 or 38, emits light 512 detectable by the CCD array 530. The light 512 from the photo-sensitive screen 510 is focused by lenses 520 (shown schematically in FIG. 5*b*) onto the CCD array 530. The CCD array 530 detects the position of the focused light and generates position signals indicative of the position of the beam spot on the CCD array. The position of the beam spot provides information regarding the angular orientation of the micro-mirrors 122 that reflected the beam. According to one embodiment, the imaging elements need 191 fJ to get 256 counts, which is equivalent to 0.2 nW c.w. detected in 1 millisecond. In this case, the total power of the beam 36 or 38 should be about 10 nW c.w. If beam 36 or 38 is a gaussian beam, it is possible to detect misalignment of a micro-mirror of less than 0.025 degrees.

Figure 6:
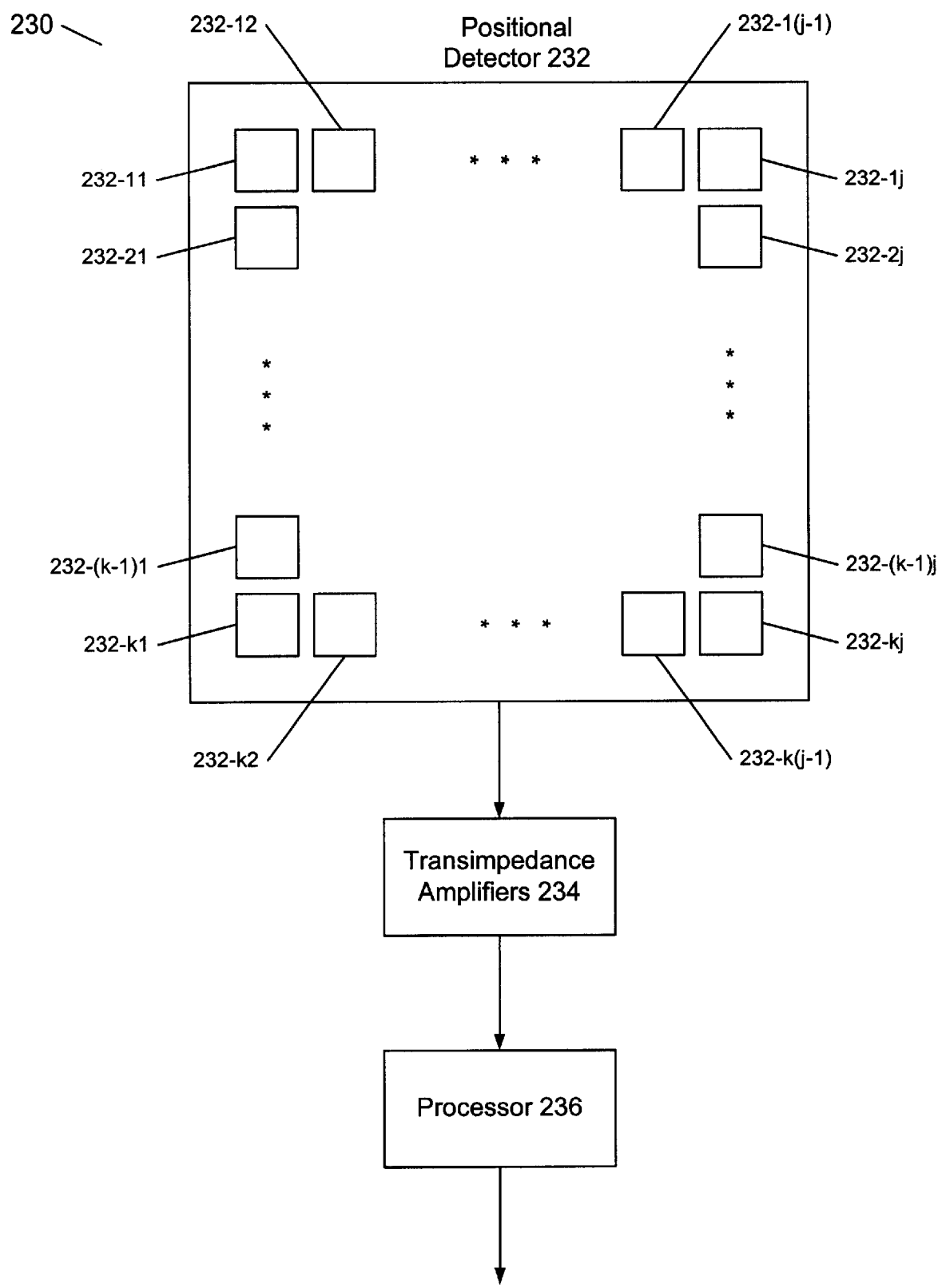
FIG. 6 illustrates an exemplary embodiment of a positional detector in accordance with the present invention.

FIG. 6 illustrates an exemplary embodiment of a detector 230 that may be used in connection with FIG. 2D of the present invention. As above, the detector 230 of FIG. 6 is intended as an example and the optical switch 10 of FIG. 2D may use detectors other than that shown in FIG. 6. As shown in FIG. 6, the detector 230 includes a plurality of sensor elements arranged in a two-dimensional array, for example, 232-11 . . . 232-1j, 232-2j, . . . 232-kj. The number of sensor elements may be selected to provide sufficient resolution in both X and Y dimensions to accurately define the micro-mirror tilt angles. Detector 230 of FIG. 6 may be used in place of the linear detectors 230*a*-1, 230*a*-2 or 230*b*-1, 230*b*-2 and may receive the beam spot from lens assembly 220*a* or 220*b* without the intervening beam splitter 222*a* or 222b. The sensor elements 232-11 to 232-kj may be coupled to amplifiers 234, which may be transimpedance amplifiers for converting current produced by sensor elements to a voltages. Similar to the embodiment described in FIG. 4, the output of amplifiers 234 may be provided to a processor 236, which generates position signals that may be supplied to the control circuitry 240.

The detector 230 may be made, for example, by integrating photonic material (InGaAsP, GaAs, etc.) directly onto silicon CMOS circuitry, for example, as described in Goossen, Walker, D'Asoro, et al, "GaAs MQW modulators integrated with Silicon CMOS," IEEE Photonics Technology Letters, Vol. 7 (4), pp. 360–362, (1995) and as described, for example, in U.S. Pat. No. 5,605,856, entitled "Method for Designing an Electronic Integrated Circuit With Optical Inputs and Outputs." This technology employs the flip-chip bonding of a substrate of III-V or IV-VI material with "mesa" type devices formed in the top surface. The devices may contain co-planar contacts disposed on the bottom surface such that all terminals of the device are electrically and mechanically joined to the underlying CMOS substrate during the bonding process. Once the bonding process has been done, the III-V substrate can be removed, resulting in a field of independent photonically active devices on an intelligent silicon CMOS substrate.

Candidate devices demonstrated include multiple quantum well (MQW) modulators, detectors, and VCSELs. Large arrays of 15×30 μm devices have been demonstrated with numbers of elements over 2000 (Krishnamoorthy, et al., "The AMOEBA switch: an optoelectronic switch for multiprocessor networking using dense-WDM," IEEE J. of Sel. Topics in Quantum Elect., Vol. 5, No. 2, pp. 261–275, (1999)). The silicon circuitry is limited only by the design space for CMOS. Therefore, circuit functions such as multiplexing, timing circuits, etc. can be used to reduce the electrical input/output requirements of the chip.

Figure 7:
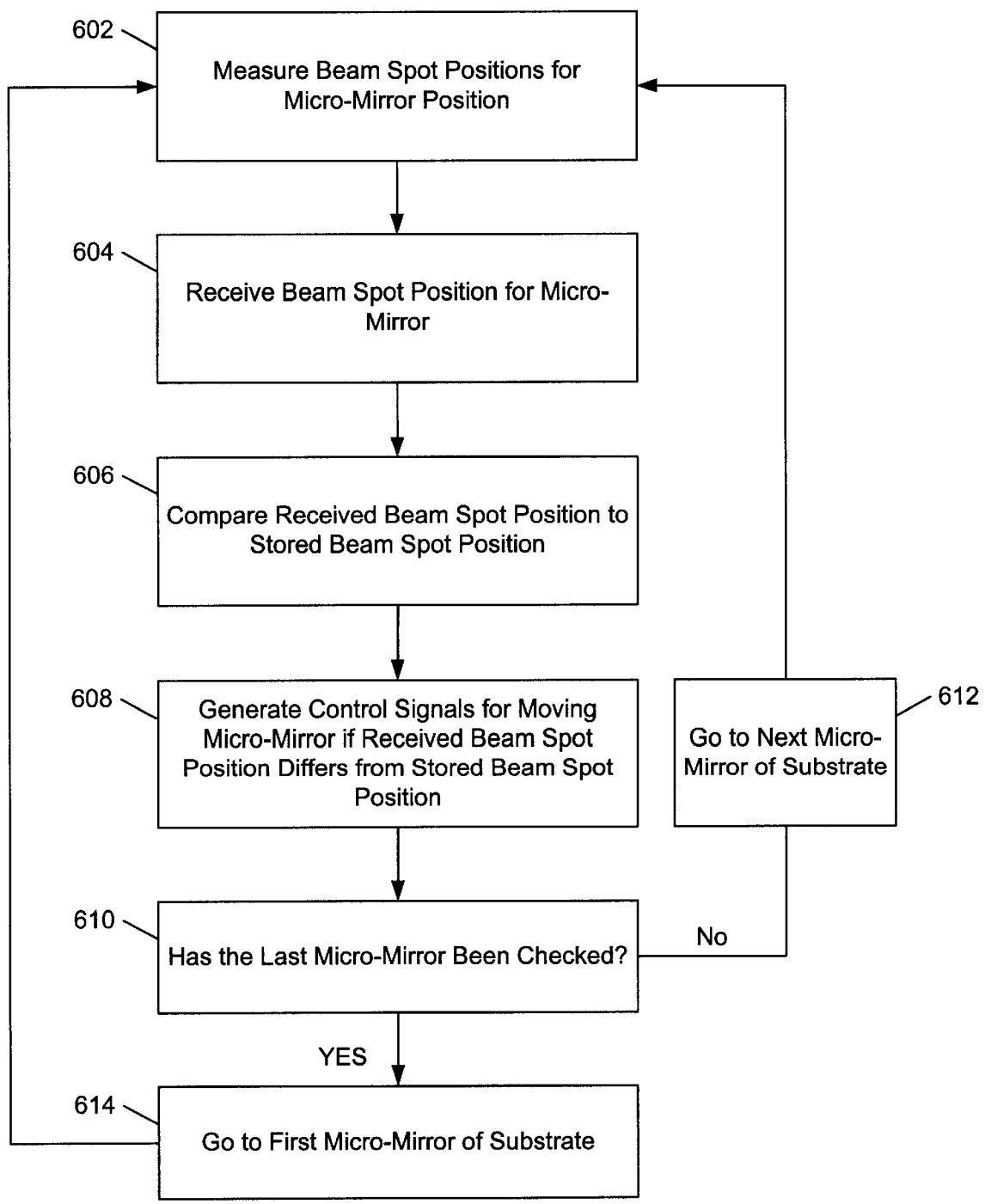
FIG. 7 illustrates an exemplary process flow for controlling the position of the micro-mirrors of an optical switch in accordance with the present invention.

FIG. 7 illustrates an exemplary process flow for controlling the angular position of the micro-mirrors of the switching substrate 100. During manufacture or installation of the optical switch 10, each micro-mirror 122 may be set at the angular positions that it may need to take during operation of the optical switch. For example, each micro-mirror 122 of the first substrate 100a may be set at each angular position required to direct the optical signal beam to each micro-mirror of the second substrate 100b. Likewise, each micro-mirror 122 of the second substrate 100b may be set at each angular position required to receive the optical signal beam from each micro-mirror of the first substrate 100a and reflect the optical signal into its corresponding micro-lens and optical output fiber 25. To set the micro-mirrors to the proper angular position, an optical signal may be supplied to an input fiber 20 and the angular position of the micro-mirrors may be adjusted until the received power in a selected output fiber 25 reaches a maximum.

When the micro-mirrors 122 of substrates 100a and 100b are properly positioned so that the optical power on the selected output optical fiber is maximized (within tolerance), the detectors 230a and 230b detect the out-of-band position control signal reflected by the micro-mirrors 122 of the switching substrates and generate beam spot position signals that are supplied to control circuitry 240. The following discussion will refer to detectors 230a and 230b for convenience and should be understood to encompass arrangements with detectors 230a-1, 230a-2, 230b-1, and 230b-2. Control circuitry 240 stores the resulting beam spot position signals generated by the detectors 230a and 230b. The stored positions may be collected in a look-up table. The setting of the micro-mirrors in the desired angular position and the measuring of the position of the beam spots may be repeated for each setting of each micro-mirror. Consequently, a table or database may be generated in which the proper position of each micro-mirror for each optical switch connection is correlated to beam spot position. Moreover, this process may be repeated periodically to recalibrate the mirror positioning control.

Thereafter, the detectors 230a and 230b may be used to monitor each micro-mirror of the respective switching substrates 100a, 100b. In particular, the detectors 230a, 230b generate beam spot position signals, which are passed to the control circuitry 240 (step 602). At step 604, the control circuitry 240 receives the beam spot position signals for a given micro-mirror 122 that reflected the position control beam that produced the beam spots or pair of micro-mirrors 122 that reflected the position control beams 36, 38 that produced the beam spots. The received beam spot position signals are compared to the stored beam spot position signals (e.g., from a look-up table) at step 606. For example, for a given connection between an input fiber 20 and an output fiber 25, a corresponding micro-mirror 122 of the first switching substrate 100a and a corresponding micro-mirror 122 of the second switching substrate 100b should be oriented at set angular positions to couple the optical signal beam from the input fiber to the output fiber. The control circuitry 240 receives the spot beam positions detected by detectors 230a and 230b when the micro-mirrors 122 are oriented in the set angular positions. At step 606, the stored spot beam positions (e.g., from the look-up table) are compared to the actual spot beam positions existing at that time.

If a variance is detected between the existing spot beam positions and the stored beam spot positions, the control circuitry 240 determines that the angular position of the micro-mirror 122 is improper and generates compensating control signals for adjusting the position of the micro-mirror to match its desired angular position (step 608). The improperly oriented micro-mirror 122 may therefore be adjusted so that it is placed in proper angular position. If no difference is detected, the control unit 240 may also send an "OK" signal and maintain the current position of the micro-mirrors.

At step 610, the control circuitry 240 determines if it has checked the last micro-mirror 122 of the substrate. If not, at step 612, the control circuitry 240 checks the angular position of the next micro-mirror 122. For example, the laser or the LED feeding the out-of-band position control signal to the fiber corresponding to the micro-mirror previously tested may be turned off and a laser or LED may be turned on so that it feeds the out-of-band position control signal to the input of the fiber corresponding to the next micro-mirror. If the control circuitry 240 has checked the last micro-mirror 122 of the substrate, it begins again by checking the first micro-mirror 122 of the substrate.

The present invention may be used together with other methods of monitoring the angular position of the micro-mirrors, for example, by capacitive sensing, such as described in U.S. application Ser. No. 09/757,475, filed Jan. 11, 2001, and incorporated herein by reference, or U.S. Application No. 09/772,084, filed on Jan. 30, 2001 and incorporated herein by reference.

Steps 604 through 612 may be performed by control circuitry 240 in response to software instructions stored in memory of the control circuitry. Steps described in FIG. 7 may be performed when optical switch is actively switching optical signals or when it is not switching active signals, such as when the optical switch is serving as a protection switch for service in the event of failure of a working optical switch. In the protection switch case, the method may be used for training the micro-mirrors 122 of the protection optical switch.

FIG. 8 illustrates an exemplary process for verifying the proper connection of optical signal beams from input fibers 20 to output fibers 25. The process may be used in optical switch architectures in which the input fibers 20 have a one-to-one correspondence to the micro-mirrors 122 of the first switching substrate 100a and the output fibers 25 have a one-to-one correspondence to the micro-mirrors 122 of the second switching substrate 100b. Thus, an optical signal from a given input fiber 20 will be coupled into a given output fiber 25 if the micro-mirror 122 of switching substrate 100a that corresponds to the input fiber 20 and the micro-mirror 122 of the switching substrate 100b that corresponds to the output fiber 25 are set to the proper angular position. That is, the micro-mirror 122 of switching substrate 100a must achieve the proper angular position to direct the optical signal beam from the input fiber 20 to the corresponding micro-mirror 122 of switching substrate 100b. The micro-mirror 122 of switching substrate 100b must achieve the proper angular position to reflect the optical signal beam for insertion into the output fiber 25.

The process of FIG. 8 is similar to that of FIG. 7. In FIG. 8, control circuitry 240 verifies the connections made by the current state of the optical switch 10. In particular, at step 607, control circuitry 240 compares the measured spot beam position to the expected spot beam position found, for example, in the look-up table. If the measured beam spot position match the stored beam spot position, then the control circuit 240 verifies the connection between the desired mirrors. As above, the connection of each micro-mirror may be verified, for example, by turning off the laser or the LED feeding the out-of-band position to the current micro-mirror and turning on an laser or LED that feeds its out-of-band position control signal to the input of the fiber corresponding to the next micro-mirror to be verified.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical switch for selectively switching optical signals between input fibers and output fibers, comprising:
   a switching substrate including a plurality of micro-mirrors that are individually tiltable about at least a first axis relative to the switching substrate, the micro-mirrors for reflecting optical signal beams and an out-of-band optical position control signal beam incident thereto, the optical signal beams and out-of-band position control signal beam being reflected in selected angular directions based on tilt angles of the micro-mirrors about at least the first axis;
   a beam splitter positioned in an optical path of the optical signal beams and the out-of-band optical position control signal beam reflected from the micro-mirrors, wherein the optical signal beams and the out-of-band position control signal beam exit the beam splitter in different directions;
   an optical position detector having a sensing surface;
   a lens assembly for focusing the out-of band optical position control signal beam from the beam splitter to produce at least one beam spot on the sensing surface of the optical position detector, wherein the optical position detector generates beam spot position signals indicative of the position of the at least one beam spot on the sensing surface; and
   control circuitry that generates control signals for controlling tilt angles of the micro-mirrors of the switching substrate responsive to the beam spot position signals.

2. The optical switch according to claim 1, wherein the beam splitter passes the optical signal beams reflected from the micro-mirrors and reflects the out-of-band optical position control signal beam reflected from the micro-mirrors.

3. The optical switch according to claim 1, wherein the out-of-band optical position control signal beam is reflected by one of the micro-mirrors at a given time.

4. The optical switch according to claim 1, wherein control circuitry compares the beam spot position signals received from the optical position detector with stored beam spot positions.

5. An optical switch for selectively switching optical signals between input fibers and output fibers, comprising:
   a switching substrate including a plurality of micro-mirrors that are individually tiltable about first and second axes relative to the switching substrate, the micro-mirrors for reflecting optical signal beams and an out-of-band optical position control signal beam incident thereto, the optical signal beams and out-of-band position control signal beam being reflected in selected angular directions based on tilt angles of the micro-mirrors about the first and second axes;
   a beam splitter positioned in an optical path of the optical signal beams and the out-of-band optical position control signal beam reflected from the micro-mirrors, wherein the optical signal beams and the out-of-band position control signal beam exit the beam splitter in different directions;
   an optical position detector having a sensing surface;
   a lens assembly for focusing the out-of band optical position control signal beam from the beam splitter to produce at least one beam spot on the sensing surface of the optical position detector, wherein the optical position detector generates beam spot position signals indicative of the position of the at least one beam spot on the sensing surface; and
   control circuitry that generates control signals for controlling tilt angles of the micro-mirrors about the first and second axes responsive to the beam spot position signals.

6. The optical switch according to claim 5, wherein the lens assembly produces first and second spot beams, and the sensing surface of the optical position detector comprises a first optical linear position detector and a second optical linear position detector, wherein the first optical linear position detector detects the position of the first spot beam in a first linear direction and the second optical linear position detector detects the position of the second spot beam in a second linear direction.

7. The optical switch according to claim 6, wherein the first linear direction is orthogonal to the second linear direction.

8. The optical switch according to claim 6, wherein the optical position detector further comprises processing circuitry that receives electrical signals output from the first and second optical linear position detectors and generates the beam spot position control signals.

9. The optical switch according to claim 5, wherein control circuitry compares the beam spot position signals received from the optical position detector with stored beam spot positions.

10. The optical switch according to claim 5, wherein the lens assembly produces a first spot beam and the sensing surface of the optical position detector detects the position of the first spot beam in two-dimensions.

11. An optical switch, comprising:
- a plurality of input optical fibers for propagating optical signals and a first out-of-band optical position control signal in a forward direction;
- a first plurality of lenses for converting the optical signals into optical signal beams and for converting the first out-of-band optical position control signal to a first out-of-band optical position control signal beam;
- a plurality of output optical fibers that propagate a second out-of-band optical position control signal in a reverse direction;
- a second plurality of lenses for converting the second out-of-band optical position control signals to a second out-of-band optical position control beam;
- first and second switching substrates, each of the first and second switching substrates including a plurality of micro-mirrors that are individually tiltable about first and second axes, wherein: (i) the micro-mirrors of the first switching substrate reflect the optical signal beams from the first plurality of lenses to selected micro-mirrors of the second switching substrate and reflect the first out-of-band optical position control beam and (ii) the micro-mirrors of the second switching substrate reflect the optical signal beams from the micro-mirrors of the first switching substrate through the second plurality of lenses and into the output fibers for propagation in the forward direction, whereby the optical signals from the input optical fibers are selectively switched to the output optical fibers, said micro-mirrors of the second switching substrate further reflecting the second out-of-band optical position control signal;
- one or more beam splitters positioned in an optical path between the first and second switching substrates, wherein the one or more beam splitters allow the optical signal beams to pass between the first and second switching substrates, direct the first out-of-band optical position control signal beam in a first direction, and direct the second out-of-band optical position control signal beam in a second direction;
- first and second optical position detectors, each having a sensing surface;
- a first lens assembly for focusing the first out-of band optical position control signal beam from the beam splitter to produce at least one beam spot on the sensing surface of the first optical position detector, wherein the first optical position detector generates first beam spot position signals indicative of the position of the at least one beam spot on the sensing surface of the first optical position detector;
- a second lens assembly for focusing the second out-of band optical position control signal beam from the beam splitter to produce at least one beam spot on the sensing surface of the second optical position detector, wherein the second optical position detector generates second beam spot position signals indicative of the position of the at least one beam spot on the sensing surface of the second optical position detector; and
- control circuitry that generates control signals for controlling tilt angles of the micro-mirrors of the first and second switching substrates about the first and second axes responsive to the first and second beam spot position signals.

12. The optical switch according to claim 11, wherein the control circuitry controls the tilt angles of the micro-mirrors of the first switching substrate based on the first beam spot position signals and controls the tilt angles of the micro-mirrors of the second switching substrate based on the second beam spot position signals.

13. The optical switch according to claim 11, wherein the first out-of-band optical position control signal is propagated in one of the input optical fibers at a time.

14. The optical switch according to claim 13, wherein second out-of-band optical position control signal is propagated in one of the output optical fibers at a time.

15. The optical switch according to claim 11, wherein the first out-of-band optical position control signal is propagated in each of the input optical fibers in a time-multiplexed manner.

16. The optical switch according to claim 11, wherein the second out-of-band optical position control signal is propagated in each of the output optical fibers in a time-multiplexed manner.

17. The optical switch according to claim 11, wherein the first lens assembly produces first and second spot beams, and the sensing surface of the first optical position detector comprises a first optical linear position detector and a second optical linear position detector, wherein the first optical linear position detector detects the position of the first spot beam in a first linear direction and the second optical linear position detector detects the position of the second spot beam in a second linear direction.

18. The optical switch according to claim 11, wherein the first lens assembly produces a first spot beam and the sensing surface of the optical position detector detects the position of the first spot beam in two-dimensions.

19. A method for optically monitoring the position of micro-mirrors in an optical switch, comprising:
- directing optical beams to a switching substrate, wherein the switching substrate comprises a plurality of micro-mirrors that reflect the optical beams in accordance with selected tilt angles of the micro-mirrors, the tilt angles of the micro-mirrors being individually controllable, and wherein the optical beams comprise optical signal beams and at least one of the optical beams comprises an optical signal beam and an out-of-band optical position control beam;
- splitting the optical beams reflected from the micro-mirrors so that the optical signal beams and the out-of band optical position control beam are directed in different directions;
- inserting the optical signal beams in selected output optical fibers; and
- focusing the out-of-band optical position control beam on a sensing surface of a optical position detector, wherein a beam spot formed on the sensing surface by the focused out-of-band optical position control beam varies spatially in accordance with the tilt angle of the micro-mirror that reflected the out-of-band optical position control signal;
- sensing the spatial location of the beam spot on the sensing surface;
- generating beam spot position signals; and
- controlling the tilt angle of the angle of the micro-mirror that reflected the out-of-band optical position control signal in accordance with the beam spot position signals.

20. The method according to claim 19, wherein the step of controlling comprises comparing the generated beam spot position signals to a desired beam spot position and generating mirror tilt adjusting signals for adjusting the tilt of the micro-mirror based on a result of the comparing step.

21. The method according to claim 19, wherein the out-of-band optical position control beam is time multiplexed into each of the optical beams such that each of the micro-mirrors successively reflects the out-of-band optical position control beam and the tilt angle of each of the micro-mirrors is controlled.

22. The method according to claim 21, wherein the tilt angles of the micro-mirrors are controlled in real time during operation of the optical switch.

* * * * *